United States Patent
Yokokawa et al.

[11] Patent Number: 6,165,053
[45] Date of Patent: Dec. 26, 2000

[54] METHOD AND APPARATUS FOR PROCESSING IN COLD AIR BLAST

[75] Inventors: Kazuhiko Yokokawa, Kawasaki; Munehiko Yokokawa, Hachiouji; Yasuhiro Hirao, Tokyo, all of Japan

[73] Assignee: Mayekawa Mfg. Co., Ltd., Tokyo, Japan

[21] Appl. No.: 08/898,476

[22] Filed: Jul. 22, 1997

[30] Foreign Application Priority Data

Jul. 24, 1996 [JP] Japan ................................. 8-213152

[51] Int. Cl.$^7$ .................................................. B24B 55/02
[52] U.S. Cl. ........................... 451/53; 451/33; 451/36; 451/449; 451/450
[58] Field of Search ........................... 451/53, 33, 36, 451/449, 450

[56] References Cited

U.S. PATENT DOCUMENTS

| | | | |
|---|---|---|---|
| 4,216,630 | 8/1980 | Smart et al. | 451/450 |
| 4,522,597 | 6/1985 | Gallant | 451/102 |
| 4,561,218 | 12/1985 | Dzewaltowski et al. | 451/450 |
| 5,088,242 | 2/1992 | Lubbering et al. | 451/449 |
| 5,470,466 | 11/1995 | Schaaf | 451/453 |
| 5,603,655 | 2/1997 | Kaneko et al. | 451/53 |

FOREIGN PATENT DOCUMENTS

| | | |
|---|---|---|
| 61-164779 | 7/1986 | Japan. |
| 1187969 | 10/1985 | Russian Federation ............ 451/449 |

Primary Examiner—David A. Scherbel
Assistant Examiner—George Nguyen
Attorney, Agent, or Firm—Evenson, McKeown, Edwards & Lenahan, P.L.L.C.

[57] ABSTRACT

Processing, such as grinding or cutting, in a cold air blast is performed at low temperature with higher precision and higher efficiency in a pollution-less situation, wherein a conventional processing fluid is not applied. A compressed dry cold air of a temperature of minus 30° C. or lower is blasted to a processing spot during processing, while a pollution-less fine mist of an oil, such as Accu-Lube, is supplied to the surface of a grinding stone in a small amount, or with a processing tool which has been treated in a fixed lubrication treatment. The apparatus includes a cooler for cooling a temperature of a filtered, compressed, dry air to minus 1° C. or lowers a cold air blasting unit for supplying the cooled dry air to a processing spot, and a device which supplies a mist of a pollution-less oil, such as a vegetable oil or the like, to the processing spot directly or indirectly by the help of the processing tool.

19 Claims, 9 Drawing Sheets

PRIOR ART (A) PRIOR ART (B) PRIOR ART

METHOD AND APPARATUS FOR PROCESSING IN COLD AIR BLAST

BACKGROUND OF THE INVENTION

1. Field of the Invention

The present invention relates to a method and apparatus for grinding by a grinding stone or cutting by a cutting bite, while the grinding stone or the cutting bite (hereinafter referred to as a processing tool) contacts with a grinding spot or a cutting spot (hereinafter referred to as a processing spot).

2. Description of the Prior Art

For example, in a conventionally used grinding process by a grinding stone, there have been two kinds, one of which is a wet grinding process, which is conducted in the presence of a grinding fluid which is continuously fed to the grinding spot and the other is a dry grinding process, which is conducted in the atmospheric air environment.

In the dry grinding process, there arise problems that a processed surface is affected directly by a grinding heat and thereby burning or cracking occurs on the surface with ease, since a grinding fluid is not used.

On the other hand, in the wet grinding process, there are such advantages as a lubricating effect, a cooling effect and a cleaning effect, but the wet grinding process not only becomes factors of deteriorating a working environment and creating pollution, since high-pressure additives, such as sulfur, phosphorus, chlorine and the like, are included in the grinding fluid in order to especially improve the lubricating effect and a mist of the grinding fluid is scattered around in an atomized condition during the processing, but the cost also becomes tremendously big for treatment of wasted oil, which is a used grinding fluid, and such a high temperature treatment as to give damages to a furnace is required in order not to produce dioxin when the used grinding fluid including chorine is treated. Under such circumstances, development of a more preferable means for grinding which can be effected without the use of a grinding fluid has been expected.

A proposal A on dry grinding which has a cooling effect, non-oxidation effect and a lower grinding resistance is disclosed in the published Unexamined Japanese Patent Application No. Heisei 7-60621.

A proposal B on grinding the surface of a rubber roller, such as a bridle roller, a coating roller, a transport roller and the like, with a grinding stone is disclosed in the published Unexamined Japanese Patent Application No. Showa 61-164779.

The above proposal A has an object to realize the effects of non-oxidation, cooling and lower grinding resistance in a dry grinding by using an inert gas as a working atmosphere. The structure of the system comprises, as shown in FIG. 13, a gastight chamber 100 covering a grinding stone processing section G, a gas tank 101 filled with an inert gas which forms the working atmosphere of the inert gas in the gastight chamber 100 and a circulatory filtration apparatus 102. The circulatory filtration apparatus 102 comprises a filter 102a, a cooler 102b and a blower 102c and an environmental gas in the gastight chamber 100 is circulated in order to be kept in a clean and cooled condition.

Accordingly the proposal A is a technique whose main feature is not to suppress first heat generation which is generation of grinding heat itself at a grinding spot but to suppress second heat generation by a oxidation combustion reaction of grinding chips.

The proposal B is a technique whose feature is to effect a grinding stone process on a workpiece surface in a cold air blast in order to cope with problems arising in a grinding process that polyurethane rubber used as material of rubber lining has poor adaptability to cutting and grinding, is hard to obtain a good surface roughness, good circularity, good straightness and good cylindrical form and besides does not allow the use of a coolant water because of poverty in water resistance and moisture resistance and the technique is conducted by simply applying a cold air blast to the surface of a rubber roller so that the surface may not be softened by a grinding heat. The proposal B has been developed in order to especially cope with a grinding process on a special member which uses polyurethane rubber as structural material, as stated in the text of the specification which is quoted as, if a temperature of the cold air blast is too low, the rubber roller is hardened too much, which causes the surface roughness of a ground surface to be deteriorated. In order to prevent a poor surface roughness, all that has to be done is to suppress an increase in temperature of the surface of the rubber roller by a grinding heat in the grinding process and it is unnecessary to positively cool the surface down to room temperature or lower. In the proposal B, there are no disclosure or suggestions on a technique comprising the use of a cold air blast at a temperature of minus 1° C. or lower or a combination of a cold air blast and a pollution-less oil mist, such as vegetable oil or the like, of fine particles, which are included in the present invention.

Despite the various efforts of improvements on conventional techniques, a problem of environmental sanitation caused by a mist generated from a grinding fluid used in a wet grinding process and a pollution problem arising also in the wet grinding process that relates to a treatment of grinding chips containing a grinding fluid, especially chlorine have not been solved yet. In a dry grinding processing, as the proposal A, a conventional grinding fluid is not used. It might become a cue leading to a solution of the above mentioned problems of environmental sanitation or pollution, but, since the dry grinding process has originally had no consideration to suppress heat generation at a grinding spot, there are risks of reduction in the hardness of a workpiece or lowering of a compression residual stress, which have not still given sufficient investigation for solutions. That is, the proposal A a simple ways for preventing not only oxidation combustion reaction, but also grinding burning and grinding cracking.

The present invention has objects to provide a method and apparatus for pollution-less, high-precision processing without the use of a conventional cutting or grinding fluid.

SUMMARY OF THE INVENTION

The inventors have made a research on the above mentioned various points and have made clear that, if a cold air blast at a temperature of minus 1° C. or lower is used for grinding and a fine mist of pollution-less oil such as a vegetable oil or the like is added in a small amount in order to cool a grinding spot, increase in temperature of a grinding process can be suppressed to a small magnitude.

A lubricating function on grinding spots, which is a determining factor in grinding performance, was investigated by comparison between grinding stones treated with a solid lubricant and not treated with the same while grinding is conducted under conditions of a constant temperature of a cold air blast, a constant wind pressure and a constant air flow rate and the results were such that a temperature increase in the case of the untreated stone is 15° C., whereas in the case of the treated stone it is as low as 8° C. It was made clear according to the comparison that cooling and lubricating functions affected greatly on the grinding performance.

A comparison has been made between grinding processes under a cold air blast at minus 1° C. with supply of a small amount of a pollution-less fine oil mist and with the use of an emulsion type grinding fluid. It has been found that, when the cold air blast is used, a temperature of the surface of a workpiece is about 2° C. higher than when the grinding fluid is used, but the temperature of the ground surface is always constant when the cold air blast is used, because of supply of the cold air at a constant temperature, while the temperature of the grinding fluid increases with the passage of time and the workpiece expands thermally to necessarily make amendments of dimensions necessary when the grinding fluid is used.

Moreover, another comparison was made on compression residual stress in grinding at room temperature between the grinding in the cold air blast and the conventional grinding with a grinding fluid. The results are shown in FIG. 6. As can be seen from the figure, the compression residual stress is a little larger when the grinding fluid is used than the cold air blast grinding, but the cold air blast grinding is two to three times larger in area of compression residual stress extending from the surface to a depth than the grinding with the grinding fluid, which is believed to be a proof that shows the superiority of the cold air blast grinding process over the grinding process with a grinding fluid.

A third comparison was made about an influence on a residual compression stress of a temperature and it was found that a residual compression stress on the ground surface of a workpiece showed the maximum at minus 32° C., from which it can be understood that it is unnecessary to lower a temperature of the cold air blast to a temperature so much lower than that temperature.

However, when a cold air 50a at a temperature equal to or less than the freezing point of water, especially minus 1° C., is blasted to a grinding spot or cutting spot from a nozzle 24 in the above mentioned grinding process in a cold air blast, as shown in FIG. 14(A), there arises a problem that moisture in the atmospheric air around the nozzle 24 increasingly adheres on a nozzle opening 24a for blasting as frost with passage of time and the frost grows to a point where grinding or cutting processes experience difficulty in being continued.

On the other hand, when a nozzle 52 for supplying a vegetable oil of very fine particles and the nozzle 24 for blasting a cold air are disposed in an adjacent positional relation, as shown in FIG. 14(B), the fine particle oil mist from the nozzle 52 is transformed to larger particles, the larger particles and a water contained in the cold air, which are blasted concurrently, can then produce frost 62 outside the supply nozzle 52 and frosting spreads to the inside of the supply nozzle 52 and the blasting opening 24a of the cold air, so that choking of the supply nozzle 52 by frosting and troubles on the opening 24a of the blasting nozzle occur.

Accordingly, the problem relating to frosting is one of the important problems the present invention seeks to solve. Supply of an oil of fine particles is directed to a grinding stone and atomization to fine particles and control of supply volume can not be performed in a sufficient degree in a current type of a direct supply apparatus of a fine particle oil, so that it is still difficult to apply the oil over the surface of the grinding stone uniformly.

Besides, a degree of frosting is considered to greatly affect the environmental conditions of grinding and, from this viewpoint, it is conceived that the working atmosphere should be kept in a dry condition and at a constant temperature.

All such circumstances being considered, the present invention proposes a method for processing in a cold air blast, wherein a grinding stone or a cutting bite (hereinafter referred to as a processing tool) is contacted with a grinding spot or a cutting spot (hereinafter referred to as a processing spot) to effect grinding or cutting, comprising the steps of: supplying cold dry air at minus 1° C. or lower to the processing spot and at the same time supplying a small amount of a pollution-less oil such as a vegetable oil of fine particles to the same processing spot directly or indirectly by the help of the processing tool.

According to a method of the present invention, a cold air of a predetermined temperature is blasted to a processing spot together with a small supply of the pollution-less oil to the same spot and thereby generation of processing heat is suppressed below a predetermined temperature, so that a fluctuation of processing accuracy caused by thermal expansion of a workpiece, which i an result of accumulation of processing heat, can be prevented and dimensional corrections for maintaining the processing accuracy become unnecessary.

The present invention has a feature that, in the above mentioned processing method, grinding or cutting is conducted with a processing tool which is treated by a fixed lubrication treatment, while the cold air of minus 1° C. or lower is supplied to the processing spot.

With the use of the grinding stone treated in the fixed lubrication treatment as mentioned above, it is made possible to keep the lubrication at the processing spot in a stable manner and to realize a pollution-less grinding or cutting and, since the cold air of a predetermined temperature is blasted to the processing spot, generation of grinding heat is suppressed below a predetermined temperature, so that the fluctuation of processing accuracy by the thermal expansion of the workpiece, which is an accumulation of a grinding heat, and thereby the dimensional correction becomes unnecessary.

In this case, it is preferable that a temperature of the cold air is in the range of minus 30 to minus 120° C. and a wind pressure is set at 1 MPa or less.

A volume of supply of the pollution-less oil is at 70 or less, or preferably 1.5 or less ml/h·mm of length of a workpiece.

The present invention is directed to an apparatus, in which the above method of the present invention is conducted, and which is used for effecting grinding with a grinding stone or cutting with a cutting bite (hereinafter referred to as processing) in a cold air blast, while a grinding stone or cutting bite (hereinafter referred to as a processing tool) is made to contact with a grinding spot or cutting spot (hereinafter referred to as a processing pot), comprising: cooling means for decreasing a temperature of a filtered, compressed dry air to minus 1° C. or lower; a cold air blasting unit which supplies a cold dry air cooled by means of the cooling means to the processing spot; and means for supplying a pollution-less oil, such as a vegetable oil and the like, of fine particles to the processing spot directly or indirectly by the help of the processing tool.

An air circulatory closed pipe line for circulation of the cold air is preferably installed, but it may be replaced with a open pipe line.

Another air stream more dried and having a higher temperature is preferably present in a manner surrounding the cold air atmosphere around the processing spot or tool.

An apparatus of the present invention can prevent frosting on a blasting opening of the cold air by forming an environmental atmosphere of air of a lower humidity around the blasting opening of the cold air with the help of an accompanying dry air.

In this case, a heat gain of the cold air flowing inside the nozzle for blasting the cold air can be suppressed to a lower level, by using a member of a lower heat conductivity as a partition wall between the nozzles of the cold air and the accompanying dry air.

It is preferable that the accompanying dry air has a temperature thereof in the range in the vicinity of room temperature, is dehumidified down to a dew point equal to or less than that of the cold air and is a dry air with a lower flow rate and lower pressure than the cold air. As a result, the frosting can be prevented, since the cold air is protected from mixed-in of the surrounding air.

The accompanying dry air is preferably produced by branching part of air, which is further treated to become the cold air, in the middle of a dry air path at an upstream position of the cooling means and then making the branched air to flow through a dehumidifier to become dry air. In such a construction, the accompanying dry air can be adjusted to be cold dry air which has a temperature and humidity in vast ranges of temperature from an extremely low dew point to room temperature, so that the accompanying dry air can contribute to prevention of frosting.

Further, the accompanying dry air can preferably be air which is produced by using air of room temperature, dehumidifying the air down to a dew point equal to or lower than that of the cold air, wherein a flow rate of the accompanying dry air is selected low and therefore, heat conduction to the side of the cold air can be also minimized.

A pressure in a header of the nozzle for the accompanying dry air is set at a low value in order to prevent its being drawn-out induced by a large velocity of the cold air stream.

The above mentioned means for supplying an oil of fine particles, for example, comprises a cold air blasting unit equipped with a suction section of a venturi tube and a high frequency vibratory atomizer of an oil communicated with the suction section of the venturi tube.

With the above construction, an oil is atomized as a mist in a sufficiently perfect level by the high frequency vibratory atomizer, then the oil mist is sucked to be mixed into the cold air at the suction section of the venturi tube of the cold air blasting nozzle and the mixed oil is then blasted to the processing spot together with the cold air, wherein the oil is mixed in the cold air in the state of a perfect mixture, not only a concentration is controllable but also a necessary amount of a supplied oil can be secured by control of a volume of the cold air. Moreover, a spot, to which the oil is supplied, is lubricated and cooled as well, since the atomized oil is drawn out by a stream of the cold air to be mixed into it and thereby a temperature of the oil mist itself is lowered.

In an apparatus of the present invention, the nozzle for supply of the oil mist and nozzle for blasting the cold air are placed in adjacent positions to each other and the nozzle for supplying the accompanying dry air is arranged outside the nozzles at least in such a manner to surround the nozzle for blasting the cold air.

According to an apparatus of the present invention, when the nozzle for supplying the vegetable oil mist and the nozzle for blasting the cold air are positioned adjacent to each other, an atmosphere of the compressed dry air is formed around the nozzle for supply of the oil mist, so that choking by frosting of the nozzle for supplying the oil mist can be prevented. Especially, frosting on the opening for blasting the cold air is prevented and a continuous operation of the apparatus for processing in the cold air blast can be realized, since a dry air wall of the accompanying dry air is formed around the nozzle for blasting the cold air.

An atmosphere around the nozzles for supply of the oil mist and for blasting the cold air is replete with or surrounded by the compressed dry air dehumidified at a temperature of the cold air and thereby a problem of frosting on the openings of blasting the oil mist and the cold air can be solved, so that a continuous operation of the apparatus for processing in a cold air blast can be achieved.

In this case, a pressure in the header of the nozzle of the accompanying dry air is set at a low value in order to prevent its being drawn-out induced when a flow velocity of the cold air blast is large.

Moreover, it is recommendable to spatially separate the nozzles for blasting the cold air and for supplying the oil mist, the processing spot and a region around them from an outside atmosphere by surrounding with an air curtain.

According to the above mentioned apparatus, frosting occurring in the vicinity of the openings of nozzles is prevented, since all the processing sections and workpiece are surrounded by a inner atmosphere isolated from an outer atmosphere and thereby a temperature and dryness of the inner atmosphere are all kept at steady states. Besides, it can be also prevented for grinding chips and a oil mist to fly away to the outside, thereby pollution of the working environment is prevented and exchanges of workpieces are conducted in a simple manner, since they are only separated from the outer atmosphere by air.

A processing atmosphere can be isolated in an airtight manner from the outer atmosphere and no influence of the outer atmosphere can act on a workpiece during processing in a cold air blast, while all the processing sections are isolated from the outer temperature, since an air curtain is formed in a surrounding manner around all the processing sections and the workpiece.

It is preferable that the air curtain is constructed in a double structure consisting of inner and outer curtains and an air stream speed in the inner curtain is set so as to be larger than that of the outer curtain and, more particularly, the inner curtain is formed from an air film of a larger speed of curtain formation and a sparse composition, whereas the outer curtain is formed from an air film of a smaller speed of curtain formation and a dense composition.

Due to the double structure, grinding chips and an oil mist are collected in a perfect manner while preventing the flying-out of them. Besides, effective curtain formation becomes possible, since there is a difference of sparse or dense between the inner and outer curtains.

In embodiments of the present invention, no purchase of a grinding fluid conventionally required is necessary and no expenses required for treatment and disposal of a used grinding fluid, grinding chips and the like is necessary, which are all related to cost reducing. Moreover, pollution caused by atomization of conventional high-pressure additives, such as chlorine, sulfur, phosphorous and the like, can be eliminated, with which the present invention attributes to improvement of an environmental sanitation, so that a processing facilities with sufficient satisfaction concerning ISO 1400 can be provided.

Furthermore, according to a method or apparatus of the present invention, not only residual compression stress in a workpiece but resistance to fatigue failure thereof can be secured in a higher level. And dimensional correction required by an increase in temperature of an oil, which has been conventionally needed, is no longer required with a reality of a higher precision processing.

According to a method or apparatus of the present invention, there is no need for operation in a working atmosphere including an oil mist, like in a case where a grinding fluid is used, and thereby grinding with a higher precision and working efficiency therein becomes possible, since a grinding operation can be put under surveillance all the time.

A higher power for processing is unnecessary, as compared with a case where a grinding fluid is used, since a grinding stone has a higher grinding ratio and a vegetable oil mist as a grinding fluid in a cold air blast method makes it possible for a ground surface to be regenerated, and due to a capability of a high speed grinding of a CBN grinding stone.

A perfect continuous operation can be realized with an accompanying dry air flowing outside the stream of the cold air, since frosting is properly prevented on the opening of a nozzle for blasting the cold air.

A perfect continuous operation can be realized in a stabler manner, since frosting on a nozzle for supply of a oil mist, which is caused by a water mist generated under influence of the adjacent nozzle for blasting a cold air, are also prevented by the use of a dry air, since the dry air can prevent the water mist around the nozzles for supplying an oil mist.

An air curtain enveloping processing sections can isolate the processing sections from the surrounding atmosphere and thereby loading and unloading of workpieces, and processing in a cold air blast can be carried out without any influence of a temperature of the outer atmosphere on the operation. In addition, pollution of the environment can be prevented due to elimination of flying-away of processing chips.

Control of supply of an oil mist in terms of concentration and amount can be made with ease, since a fine oil mist is mixed into the cold air at a perfect degree of mixing due to perfect atomization by an apparatus for supplying an oil mist.

In the above description, embodiments of an apparatus for grinding in a cold air blast only are stated, it should be self-explanatory that the present invention can be applied to an apparatus for cutting in a cold air blast, in which a cutting bite is used

BRIEF DESCRIPTION OF THE DRAWINGS

FIG. 1 is a showing a compression residual stress for each ground sectional area per unit time based on actual tests in the apparatus in FIG. 1.

DETAILED DESCRIPTION OF THE PREFERRED EMBODIMENT

Embodiments of the present invention will be described in reference to the accompanying drawings. It should be clearly understood that dimensions and shapes of parts of construction and relative positions among them described in the embodiments, unless particularly specified, are not intended to limit the scope of the present invention, but only exemplary.

Figure 1:
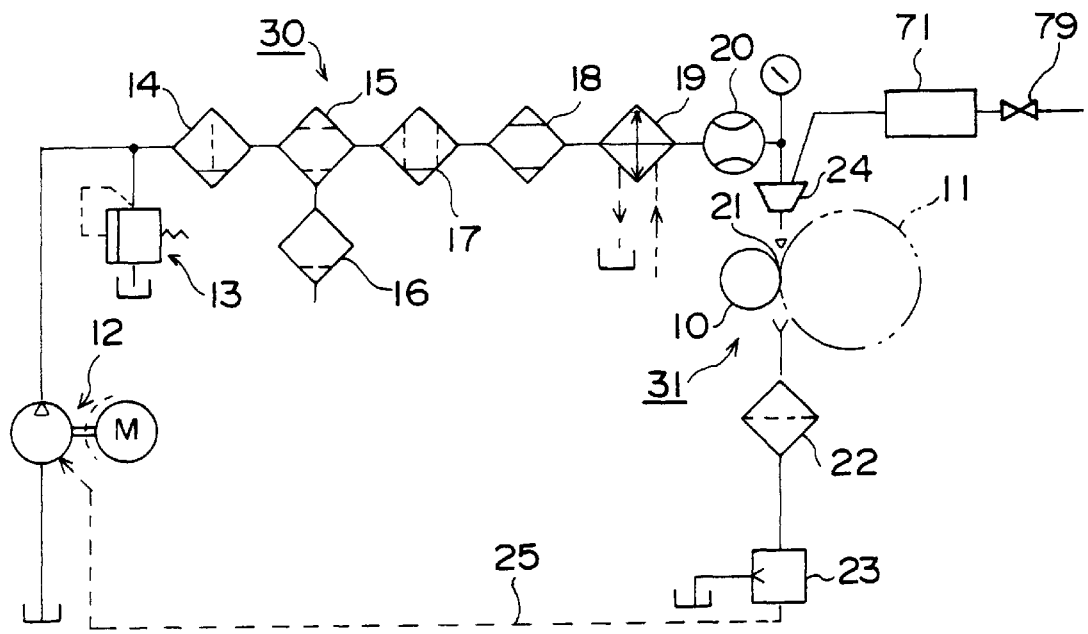
FIG. 1 is a system diagram schematically showing of an apparatus for grinding in a cold air blast according to an embodiment of present invention.
Figure 2:
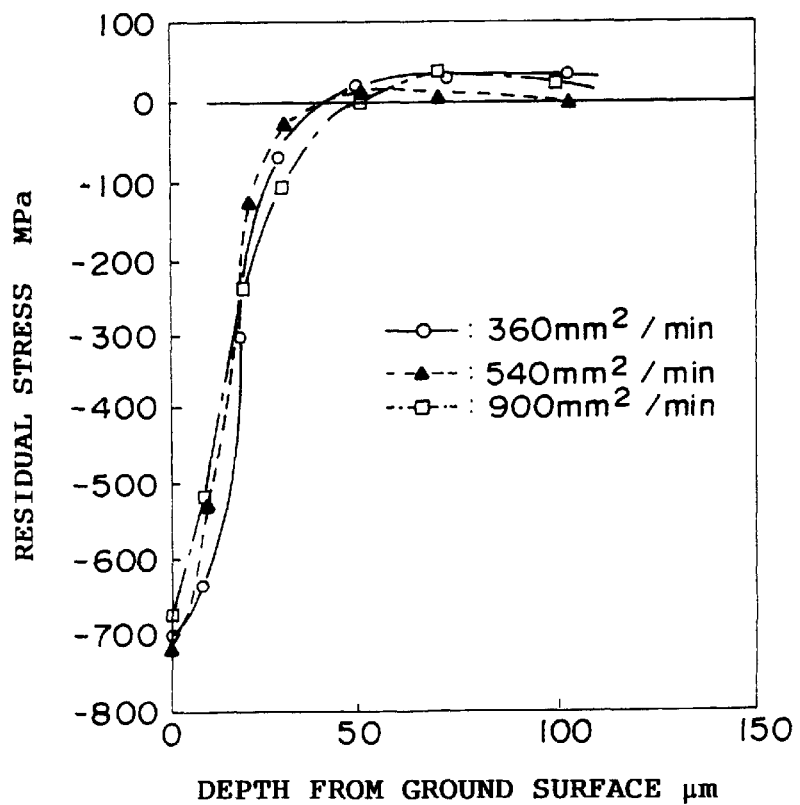

FIG. 1 is a system diagram schematically showing of an apparatus for grinding in a cold air blast according to an embodiment of the present invention. FIG. 2 is a graph showing a compression residual stress for each ground sectional area per unit time.

Figure 3:
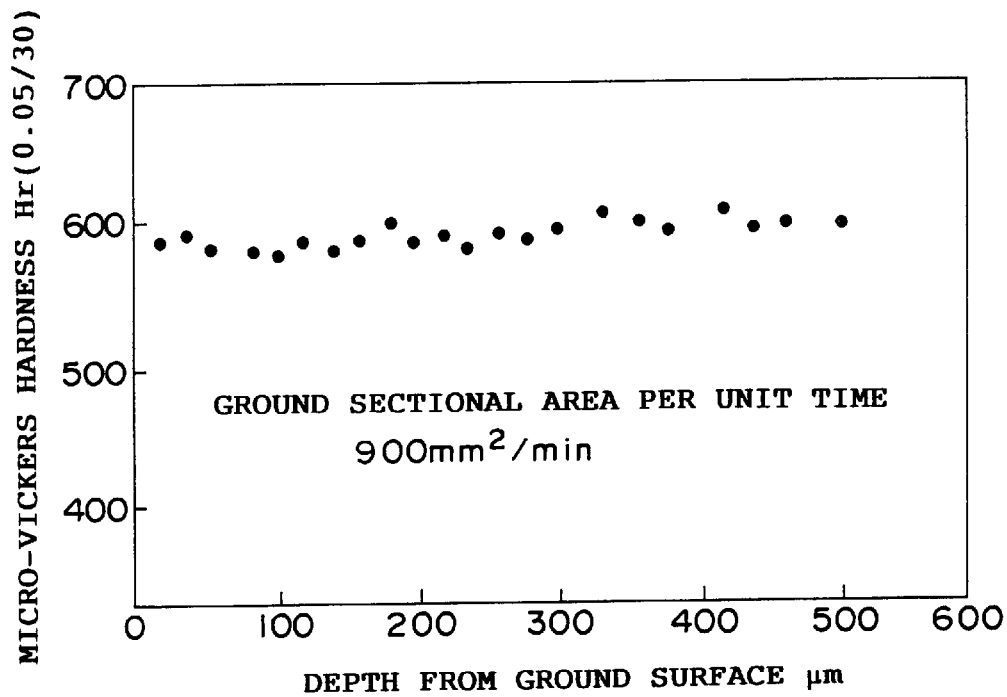
FIG. 3 is a graph showing depthwise changes in hardness of a workpiece based on actual tests in the apparatus in FIG. 1.
Figure 4:
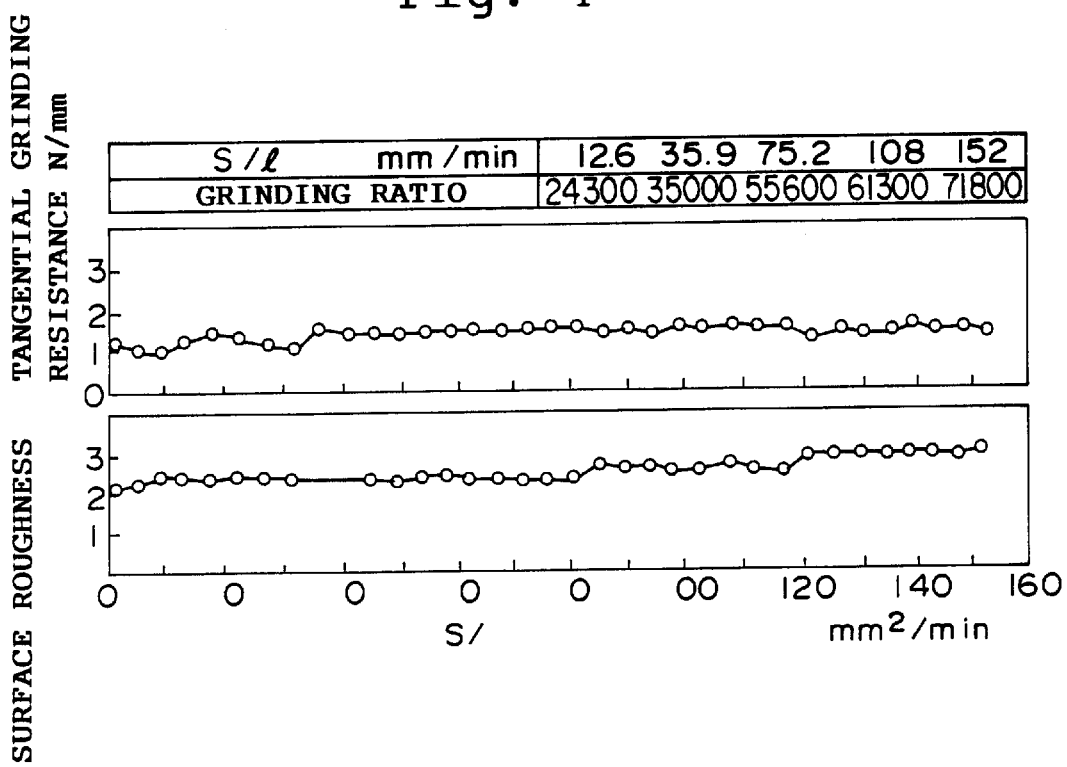
FIG. 4 is a graph showing grinding performances in a cold air blast in a continuous mode base on actual tests with the use of a CBN grinding stone in the apparatus in FIG. 1.
Figure 5:
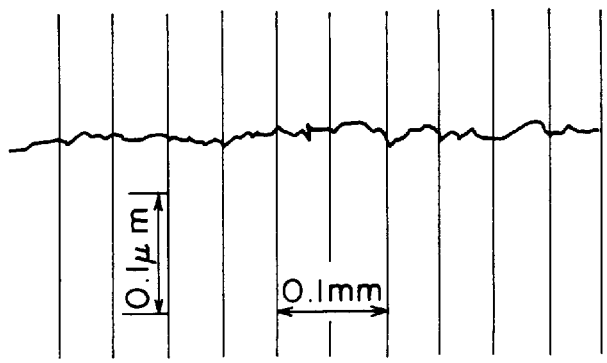
FIG. 5 is a graph showing actual measurements of roughness on mirror-finished surfaces with the use of a CBN grinding stone according to a method for grinding in a cold air blast of the present invention.

FIG. 3 is a graph showing depthwise changes in hardness of a workpiece. FIG. 4 is a graph showing grinding performances in a continuous mode with the use of a CBN grinding stone embodying the present invention. FIG. 5 is a graph showing actual measurements of roughness on mirror-finished surfaces with the use of a CBN grinding stone embodying the present invention.

As shown in FIG. 1, a pressure of a compressed air compressed by a compressor 12 is adjusted by a relief valve 13, dusts included in the compressed air are filtered by a main filter 14, then the compressed air is dried by an air drier 15, thereafter it is received a second filtration and a second drying respectively by a mist separator 17 and an air drier 18, then it is cooled by a heat exchanger 19 which exchanges heat with a refrigerating cycle not shown to prepare a cold air, then the flow rate of a cooled air is adjusted by a flow meter 20 and finally the cold air is blasted to a grinding spot 21 from a cold air blasting unit 24. A temperature of the cold air blasted out from the cold air blasting unit 24 is set at a temperature of minus 1° C. or lower, or preferably in the range of minus 30 to minus 120° C., a wind pressure of the cold air blast is equal to or less than 1 MPa or less, or preferably equal to 0.39 MPa and the cold air is blasted in a single direction from above or in three directions comprising from both sides in addition to that from above.

Figure 12:
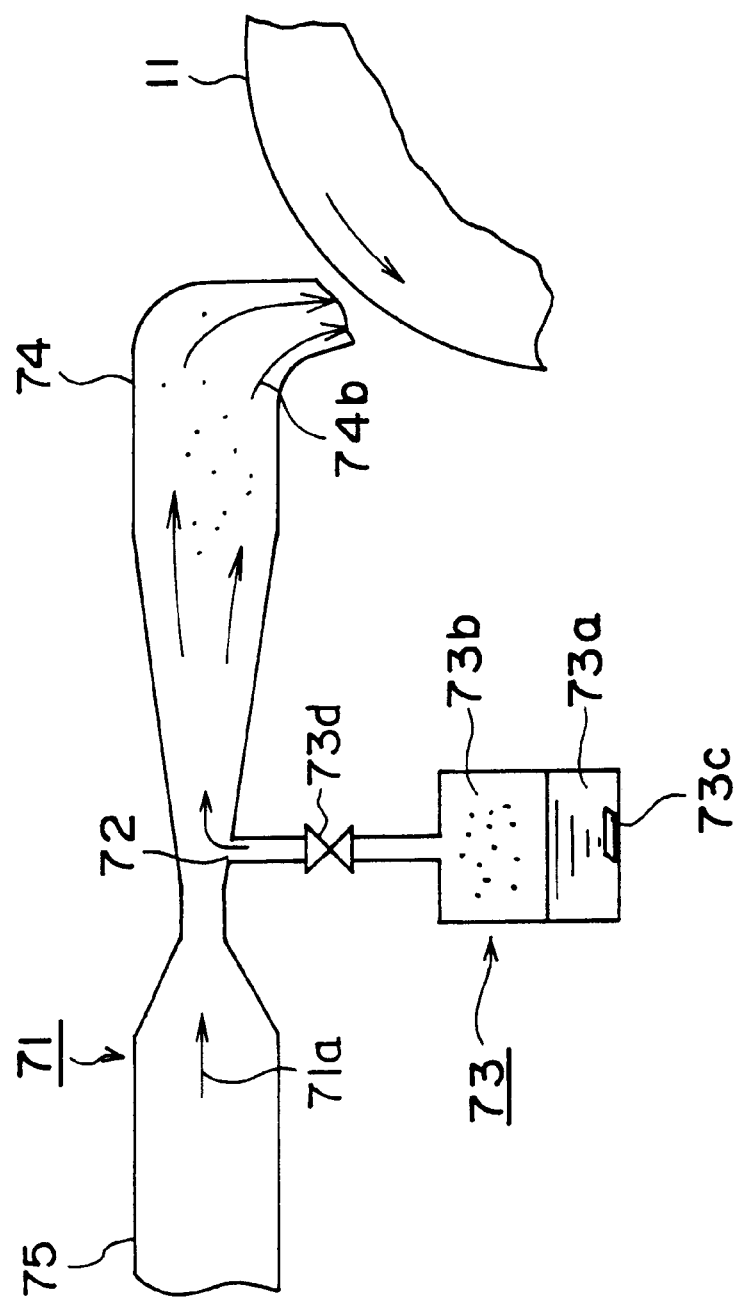
FIG. 12 is schematic view showing a structure of a device for supplying an oil mist.
Figure 13:
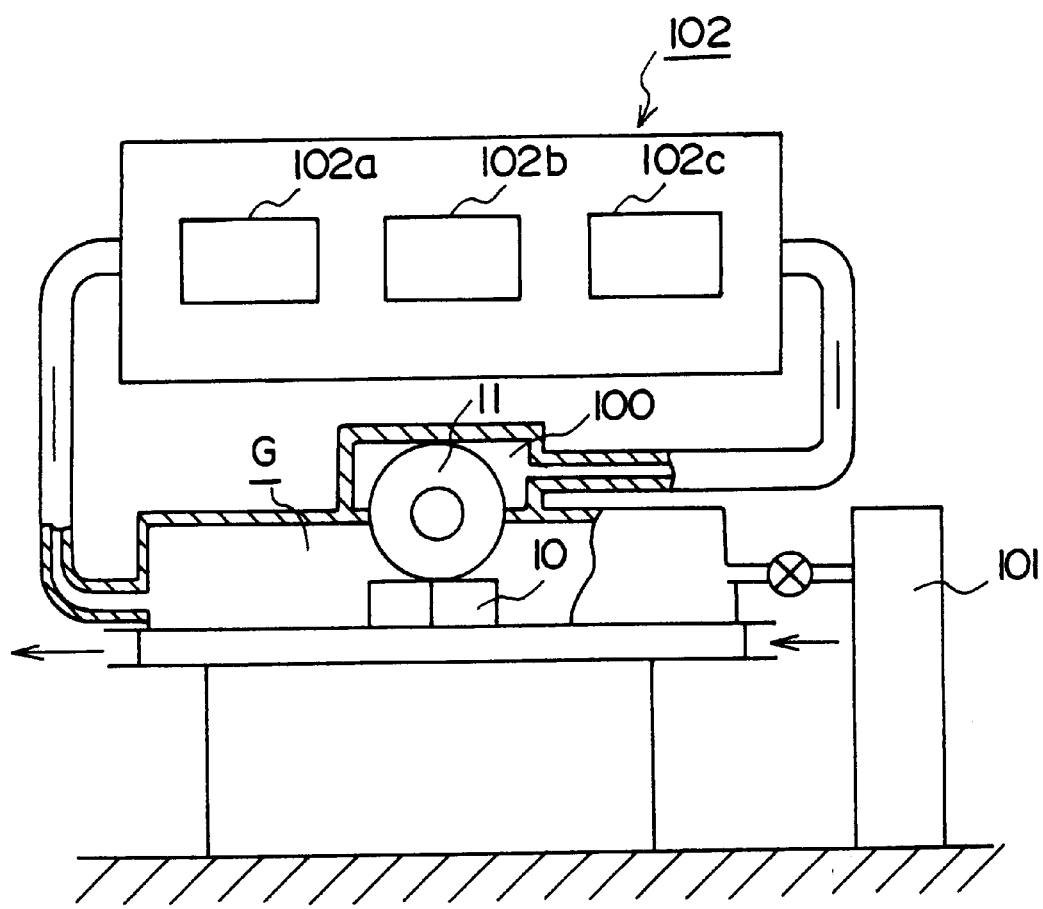
FIG. 13 is a schematic view partly in section showing a conventional apparatus for a dry grinding process.
Figure 14:
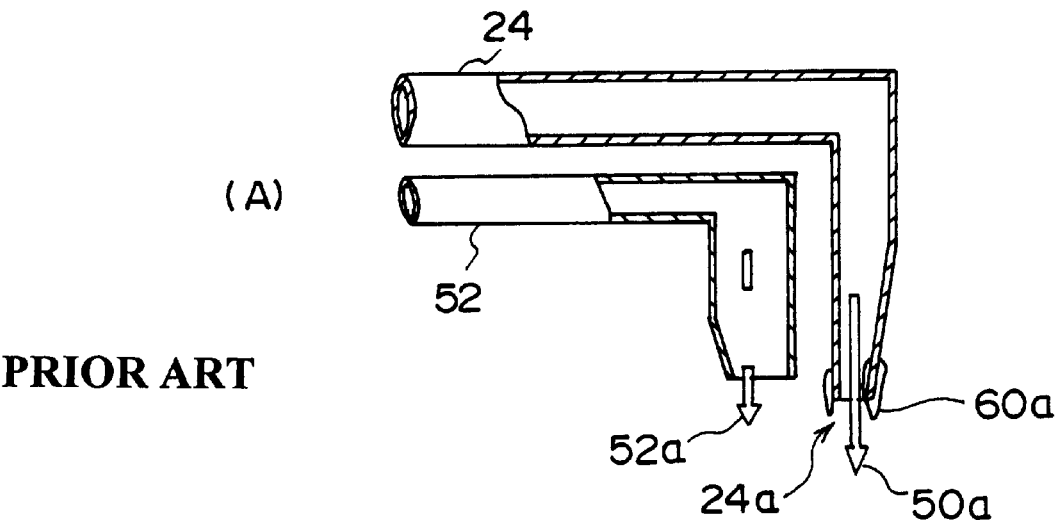
FIG. 14(A) is a sectional view showing a conventional configuration of nozzle and a state of frosting on the opening of a nozzle for blasting a cold air directed to a grinding spot when it is independently arranged.
FIG. 14(B) is a sectional view showing a configuration of nozzles and a state of frosting on the opening of a nozzle for blasting a cold air directed to a grinding spot when it is arranged adjacent to a nozzle for supplying an oil mist.
Figure 14:
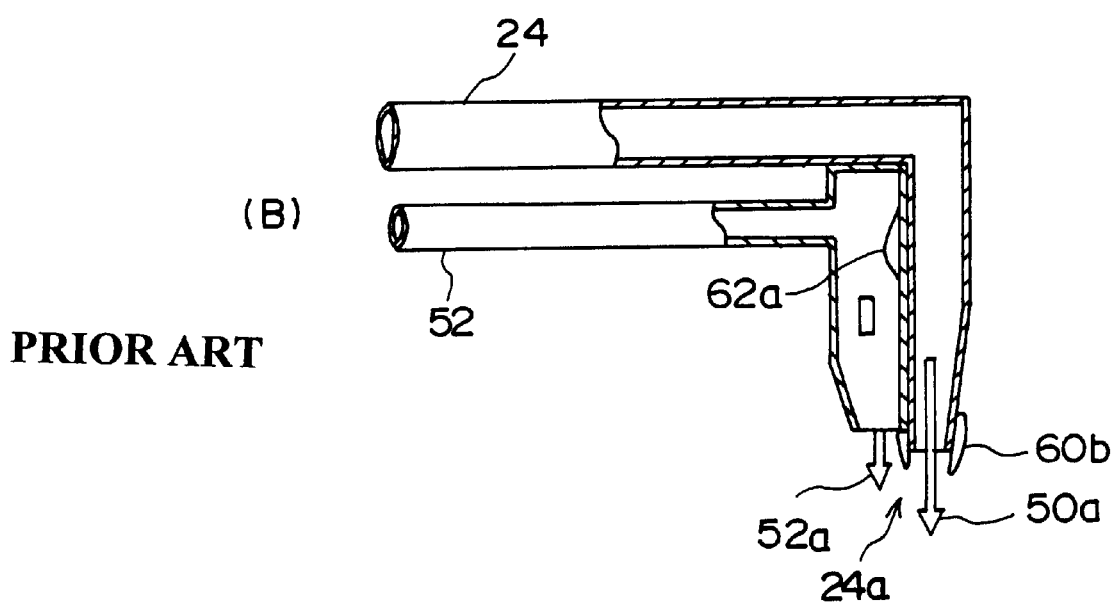

A cold air grinding section 31 consisting of a workpiece 10 and a grinding stone 11 supplies a pollution-less vegetable oil mist (for example Accu-Lube) by a means for supplying an oil mist 71, as shown in FIG. 12, to the grinding stone 11 at a rate of 70, or preferably 1.5 ml/h·mm of a unit length of a workpiece.

The grinding stone 11 is a conventional grinding stone with large-sized grains and a large crushing resistance or a super abrasive grinding stone.

The grinding stone may be a grinding stone treated by a fixed lubrication treatment. In this case, a small amount of supply of the vegetable oil mist is unnecessary and, accordingly, a grinding process is conducted only with control of supply of a cold air, wherein the supply of an oil mist and a cold air may be of course acceptable as operational conditions.

The cold air, which has passed the grinding spot is sucked by a vacuum pump 23 after it passes a filter 22 inserted before the pump 23, then sucked by a suction side of the compressor 12 through a return pipe 25 for recovery of the used cold air and a compressed air from the discharge side of the compressor 12 is then supplied into the same paths, which construction constitutes a circulating system 30 for cooling air as a whole.

In an open cycle system, the cold air which has been blasted to the grinding spot 21 is sucked by the vacuum pump 23 in a state that grinding chips is included in the sucked air from under the processing spot and, on the other hand, in a closed system the cold air from which the grinding chips have been removed is sucked through the return pipe 25 by the compressor 12 at the suction side so as to complete the circulating system 30 for cooling air.

The means 71 for supplying a vegetable oil mist in a small amount has a valve 79 for stopping the supply if circumstances require, and, in the case where a grinding process in a cold air blast is performed with supply of a cold air and a grinding stone treated by a fixed lubrication treatment, the supply of a vegetable oil mist is stopped.

Results of actual tests by means of such a method for grinding in a cold air blast will be described in reference to FIGS. 2 to 5.

In FIG. 2, a pollution-less vegetable oil mist was supplied at a rate of 1.5 ml/h·mm of a unit length of a workpiece to effect a lubricating action, a cold air blast was given in a direction from above the workpiece. Values of the ground sectional area per unit time were selected 360, 540 and 900 mm$^2$/min and grinding was performed on a SCM 435 as a workpiece. Changes in compression residual stress with increases in depth from the ground surface are shown in the figure. The measurements of the compression residual stress are larger, that is better , as compared with those of a wet grinding process in which a conventional grinding fluid is used.

In FIG. 3, results of measurements of the micro-Vickers hardness for each depth from a ground surface on a workpiece 10 (SCM 435) are shown, wherein a grinding process was performed in a cold air blast at a ground sectional area per unit time of 900 mm$^2$/min and the vegetable oil mist was supplied at a rate of 1.5 ml/h·mm. The surface was not softened by grinding heat and the measurements of the micro-Vickers hardness show that the hardness is almost equal in the bulk from the surface to a depth. The results show that a method for grinding in a cold air can produce a product with an excellent abrasion resistance.

In FIG. 4, results of measurements of the surface roughness and tangential grinding resistance when a grinding process in a cold air blast was performed at a ground sectional area per unit time S of 90 mm$^2$/min are shown, wherein a CBN stone was used, a cold air at a temperature in the range of minus 30 to minus 35° C. was blasted, a vegetable oil mist was supplied at a rate as small as 1.5 ml/h·mm of a unit length on a workpiece.

According to the results shown in the figure, the tangential grinding resistance and surface roughness up to an S of 152 mm$^2$/min are respectively almost equal to 1.5 N/mm and 3 µm Rz. Grinding ratios are shown to have been increased to 71800. From all the measurements, the grinding performance in this case can be said to show better results by a factor of about 2, as compared with a conventional wet grinding method.

In FIG. 5, results of measurements are shown, wherein a CBN grinding stone, whose abrasive grains were hard to be crushed, was used and a mirror-finished surface of a high quality without any scratches thereon was obtained.

Figure 6:
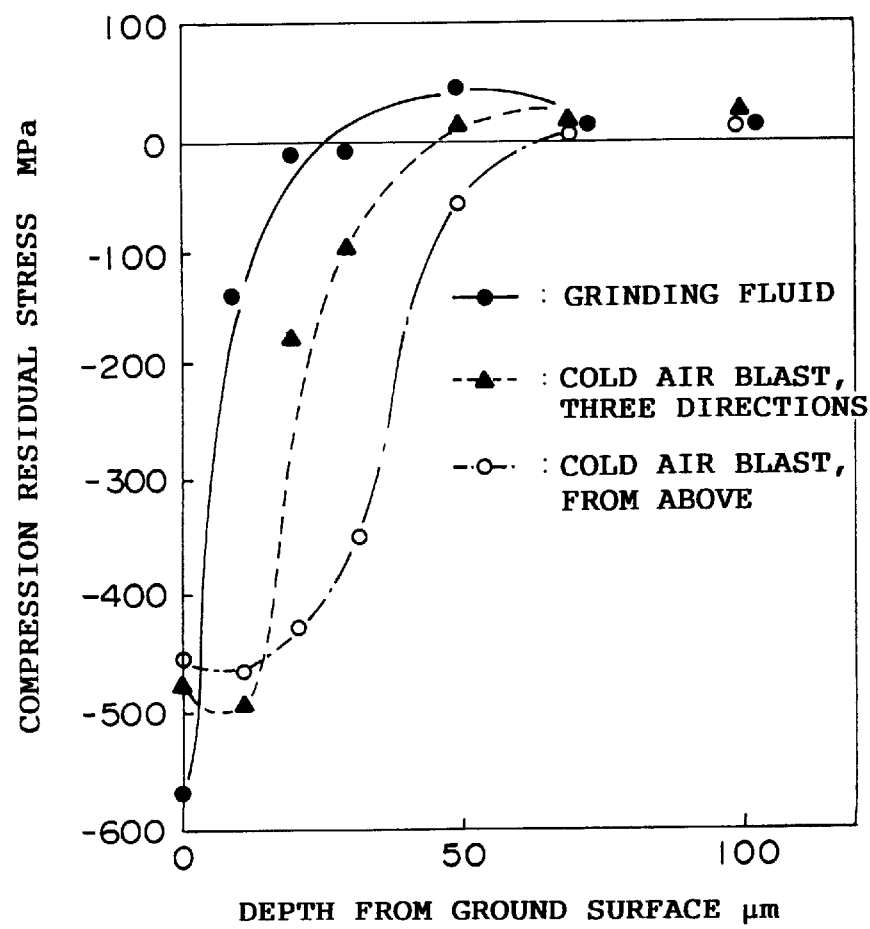
FIG. 6 is a graph showing a comparison on the compression residual stress in a workpiece between a method for grinding in a cold air blast and a wet grinding method with the use of a conventional grinding fluid.

In FIG. 6, results of measurements of compression residual stress on a workpiece of SCM 435 in the apparatus of FIG. 1 are respectively shown as a comparative graph in three cases: two where a grinding process in a cold air blast was performed at a ground sectional area per unit time of 90 mm$^2$/min with a cold air blast in a single direction from above and another cold air blast in three directions of from above and both sides; and the other where a conventional wet grinding process with the use of a grinding fluid in the form of emulsion was performed. As seen from the graph, compression residual stresses at the surface or in a region close to the surface in the conventional wet grinding process are a little bit larger than those of the grinding process in a cold air blast, but, in the two cases of the latter process, the stress affects the interior of the workpiece in a sectional area two to three times as large as in the former process.

Outlines of the solution of the problem of frosting accompanied with a cold air blast and shapes of the nozzles of the present invention will be described in reference to FIGS. 7 to 9.

Figure 7:
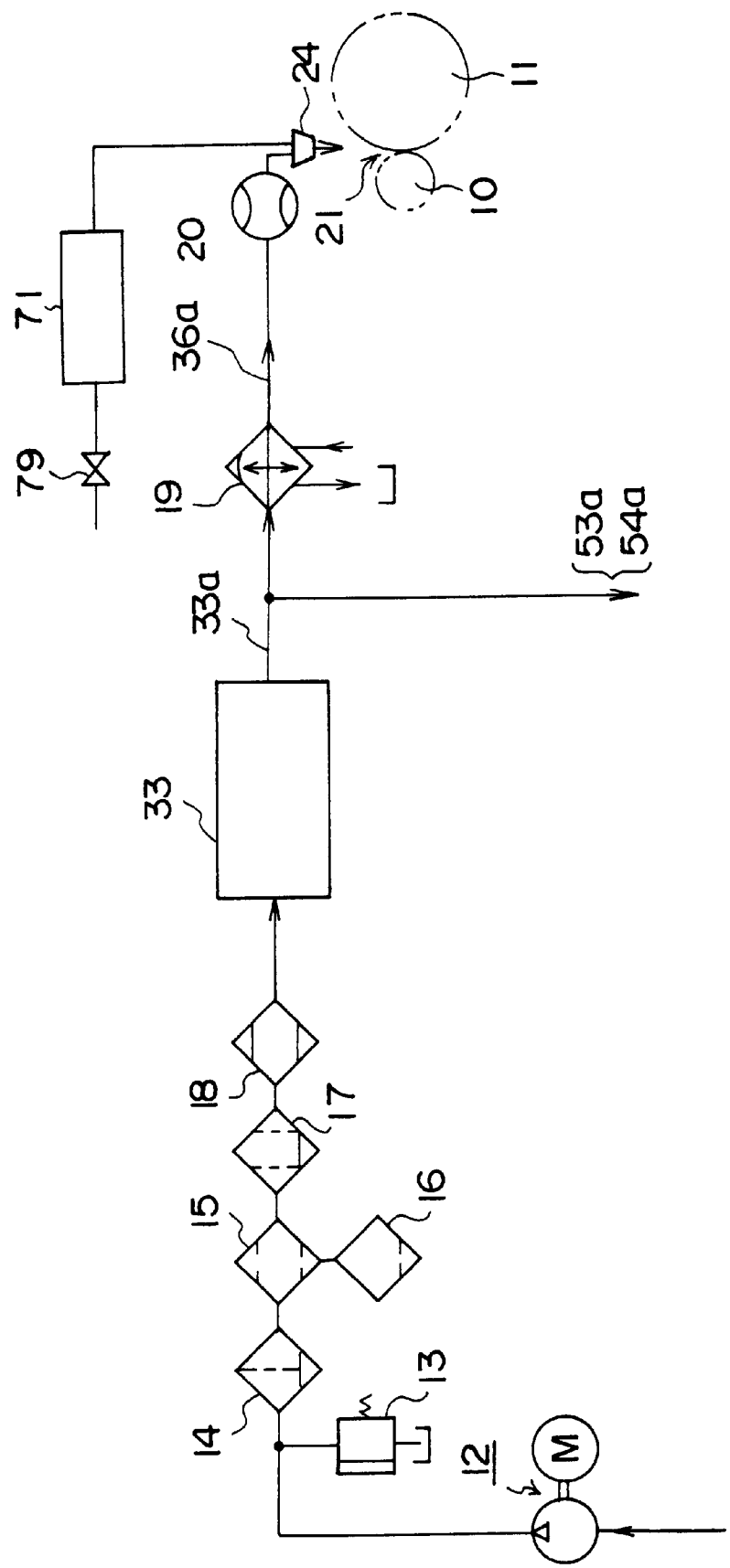
FIG. 7 is part of a system diagram schematically showing a cold air blast grinding system, in which a preventive measure is taken against frosting in the apparatus for grinding in a cold air blast of FIG. 1.

FIG. 7 is part of a system diagram schematically showing a cold air blast grinding system, in which a preventive measure against frosting in the apparatus for grinding in a cold air blast of FIG. 1 is equipped. The system is to prevent a stoppage or the like of an operation by frosting in cooperation with the measure against frosting given to nozzles for a cold air blast shown in FIGS. 8 and 9.

As seen from FIG. 7, in the cold air blast system including a preventive measure of the present invention, a dehumidifier 33 of a adsorption type is inserted before an heat exchanger 19 which works as a cooling means to cool the air, thereby a compressed dry air 33a is produced, then the dry air is passed through the heat exchanger 19 or branched to obtain a dry air 53a, 54a, the dry air 33a, which is to pass the heat exchanger 19 at a downstream position, is cooled to a predetermined extent during the passage in it to produce a compressed air 36a with a lower humidity, for example minus 70° C. as a dew point, and lower temperature and the compressed cold air 36a is then blasted to a grinding spot 21 through a cold air blasting unit 24. On the other hand, the branched dry air 53a, 54a is designed to be supplied through a predetermined path in a nozzle so as to envelope a stream of the cold air 36a, as shown in FIGS. 8 and 9.

The above mentioned dehumidifier 33 of an adsorption type has a function that air to be treated is contacted with an adsorbent in it to remove water in the air and as the adsorbent, there are named silica gel, active alumina, synthetic zeolite and active carbon. In the dehumidifier 33, the air to be treated is contacted with an adsorbent with a higher efficiency.

Figure 8:
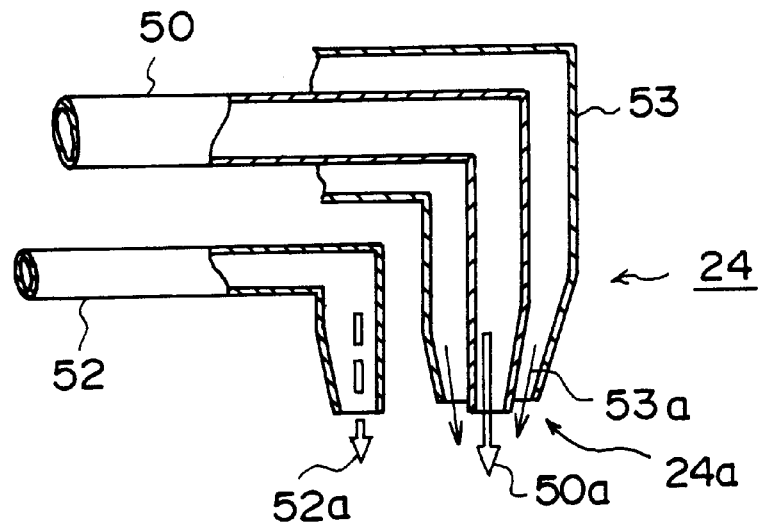
FIG. 8 is a sectional view showing a configuration of nozzles for supplying a vegetable oil mist and for blasting a cold air, wherein a preventive measure against frosting is taken.

FIG. 8 shows a configuration of a group of nozzles, wherein a nozzle 50 for blasting a cold air 50a in a cold air blasting unit 24 to a grinding spot 21 is arranged in the vicinity of a nozzle 52 for supply of a vegetable oil mist 52a. In this case, the nozzle 50 for blasting the cold air is located in the center and the nozzle 53 for supply of an accompanying dry air 53 is arranged outside the nozzle 50 for blasting the cold air in a double structure of nozzles, wherein the cold air 50a blasted from the nozzle 50 for blasting a cold air is surrounded with the dry air 53a of room temperature supplied from the nozzle 53 for supply of an accompanying dry air.

The dry air 53a (hereinafter sometimes referred to as an accompanying air) is air which is dehumidified by the dehumidifier 33 of an adsorption type to a dew point equal to or lower than a temperature of the cold air at the opening of the nozzle 50.

In the conditions and configuration of components, an atmosphere around the nozzle opening of the cold air blasting unit 24 is surrounded by a stream of the accompanying dry air 53a and thereby frosting around the opening is perfectly prevented, so that troubles at the opening caused by growth of frost there and accompanying problems such as stoppage of an operation and the like are solved.

As the accompanying dry air 53a, a dry air of room temperature may be used, wherein a supply speed of the accompanying air 53a is adjusted to a speed as low as possible in order to minimize heat conduction to a surrounding cold air and thereby reduce heat loss. A pressure of the accompanying air 53a is preferably adjusted at a low value so as to suppress a phenomenon that the accompanying air is drawn in by a much larger speed of blasting of the cold air blast.

In this embodiment, the accompanying air 53a is supplied as branched air at a position before the heat exchanger 19 from a compressed dry air 33a which is already dehumidified by means of the dehumidifier 33 of an adsorption type as shown in FIG. 7, but it can be dry air independently prepared outside the above circulating system.

The nozzle 50 is preferably made from ceramic or the like and a partition wall between the nozzles 50, 53 for blasting a cold air and for supply of an accompanying air is also preferably made from a member of a low heat conductance in order to suppress increase in temperature of the cold air to a low level.

Figure 9:
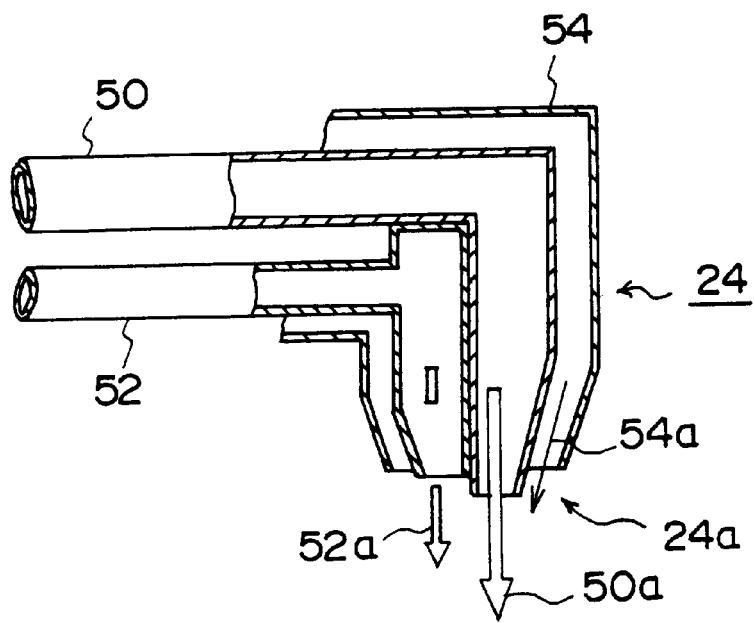
FIG. 9 is a sectional view showing a configuration of nozzles in another embodiment including another types of nozzles.

FIG. 9 shows a measure against frosting when the nozzle 50 of the cold air blasting unit 24, which is used for blasting the cold air 50a, is arranged in a adjacent position to the nozzle 52 for supplying a oil mist, which supplies a vegetable oil mist 52a. The nozzle 50 of the cold air blasting unit 24 and the nozzle 52 for supply of a oil mist, which are arranged in an adjacent position to each other, are located in a central portion of the whole structure and the nozzle 54 for supply of the compressed dry air 54a is arranged outside them.

The compressed dry air 54a in this case is prepared by branching part of air 33a dehumidified up to a necessary dew point by means of the dehumidifier 33 of an adsorption type as shown in FIG. 7 at a point before the heat exchanger 19.

With the above mentioned construction, perfect defrosting is achieved in contrast with the case where a conventional compressed air without dehumidification is used.

Next, isolation of a working atmosphere from the outside air in the apparatus for grinding in a cold air of FIG. 1 will be described in reference to FIGS. 10 to 11.

Figure 10:
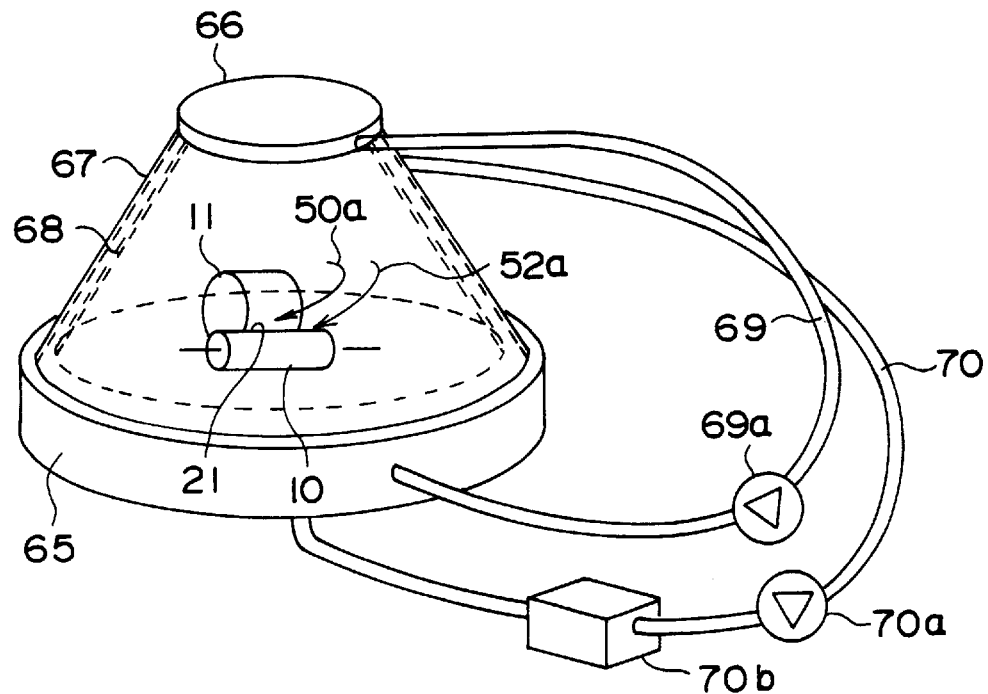
FIG. 10 is a schematic view illustrating a device for formation of an air curtain used in the apparatus in FIG. 1.

FIG. 10 is a schematic view illustrating a device for formation of an air curtain used in the apparatus in FIG. 1.

Figure 11:
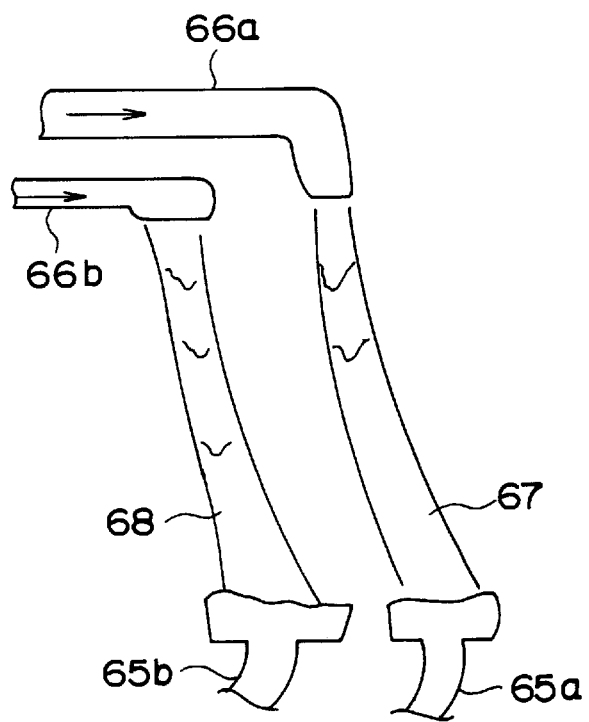
FIG. 11 is a sectional view showing a main portion of the device of FIG. 10 where the air curtain is formed.

FIG. 11 is a sectional view showing main portion where the air curtain is formed in FIG. 10.

As can be seen in FIG. 10, the air curtain for formation of a working atmosphere isolated from the outside atmosphere covers a grinding spot 21, a grinding stone 11 and a workpiece 10 in a tapered form. The air curtain is divided into two subcurtains of an inner curtain 68 and an outer curtain 67. The device for formation of a air curtain further includes an upper header 66 of a supply side, a lower header 65 of a suction side, an outer closed air circulating piping 69 and an inner closed air circulating piping 70.

In the outer closed air circulating piping 69, an outer circulating pump 69a is inserted and in the inner closed air circulating piping 70, an inner circulating pump 70a and a filter 70b is inserted with which grinding chips and a oil mist flying away from a processing spot are collected and removed. As shown in FIG. 11, the upper header 66 for supplying air has two air supply ports 66a, 66b on an outside and an inside respectively and the lower header 65 also has two air suction ports 65a, 65b on an outside and an inside respectively, with which construction an outer air curtain and an inner air curtain 67, 68 are independently formed at flow speeds.

In this embodiment of the device, an air flow speed of the inner air curtain 68 is set larger than that of the outer air curtain 67 so that draw-in of the outer atmosphere is prevented.

In such a construction of the embodiment, exchanges of workpieces 10 are easier, since the isolation is effected by an air curtain, and grinding chips and a oil mist flying away from the processing spot can be absorbed in a stream of the inner curtain 68 to be filtered out with the filter 70b, so that pollution of the environment is avoided.

A working atmosphere can be kept in a steady state independently of a temperature and a humidity of the outer atmosphere, since it is perfectly isolated from the outer atmosphere with a double curtain. A temperature or humidity at a grinding spot or a cutting spot is not affected by a temperature or humidity of the outer atmosphere, is determined only by a temperature or humidity of a cold air and the temperature and humidity are kept constant. In such circumstances, a thermal expansion of part of a workpiece around the processing spot is maintained in a constant level, so that dimensional precision in processing is improved.

FIG. 12 is a schematic view showing a structure of a device for supplying an oil mist. As seen from the figure, the device for supplying an oil mist 71 basically has a structure of a venturi tube, and it comprises a nozzle 74 for supplying a cold oil mist at a fore end of the device, a venturi tube 75 having a suction port 72 in a throat portion thereof and an electromagnetic atomizer 73 communicating with the suction port 72 with a valve 73d inserted therebetween.

An oil mist 73b is drawn into the venturi tube 75 through the valve 73d at the throat portion thereof by a stream of a cold air 71a, which is introduced into an inlet thereof and shot out to the processing spot as an oil mist dispersed in a cold air 74b from the fore end of the nozzle 74 together with the stream of the cold air 71a.

The electromagnetic atomizer 73 comprises a vessel containing an oil 73a and a piezoelectric transducer 73c, for example, which generates a high frequency oscillation by application of a high frequency voltage to atomize the oil 73a and form an oil mist 73b.

As described above, the oil 73a is atomized to form an oil mist 73b in the electromagnetic atomizer in a perfect manner before it is mixed into the stream of the cold air 71a, thereby the oil mist 73b is perfectly dispersed in the cold air 74b in a homogenized manner before the fore end of the nozzle 74 after the oil mist 73b is sucked into the stream of the cold air at the throat portion 72 and, besides, an amount of supply of an oil can be regulated in a secured manner by controlling a flow rate of the cold air blast to have even a predetermined small amount thereof supplied to the processing spot in a state of perfect, fine particles.

What is claimed is:

1. A method for processing in a cold air blast, wherein a grinding or cutting tool contacts a grinding or cutting spot on a workpiece to effect grinding or cutting, comprising the steps of: supplying cold dry air of −1° C. or lower to the grinding or cutting spot, and, at the same time, supplying atomized vegetable oil in an amount of 70 ml/h or less per mm of workpiece length to the same grinding or cutting spot by way of the grinding or cutting tool.

2. A method for processing in a cold air blast according to claim 1, wherein a temperature of the cold dry air is set in a range of about minus 35° C. to minus 30° C. and a wind pressure thereof is set at about 0.39 MPa to apply a compression residual stress of between minus 400 MPa and minus 100 MPa to an average depth of at least 10 $\mu$m from a ground surface of the grinding or cutting spot.

3. A method for processing in a cold air blast according to claim 1, wherein the supply of atomized vegetable oil is supplied to the grinding or cutting spot together with the cold dry air.

4. A method for processing in a cold air blast according to claim 1, and further comprising the steps of setting the cold dry air temperature and wind pressure so as to apply a compression residual stress of between minus 400 MPa and minus 100 MPa to an average depth of at least 10 $\mu$m from a ground surface of the grinding or cutting spot, and, at the same time, setting the supply of atomized vegetable oil at 70 ml/h·mm or less of length of a workpiece.

5. A method for processing in a cold air blast, wherein a grinding or cutting tool contacts a grinding or cutting spot to effect grinding or cutting, comprising the steps of: supplying cold dry air of minus 1° C. or lower to the grinding or cutting spot, and, at the same time, supplying vegetable oil to the same grinding or cutting spot by way of the grinding or cutting tool, wherein another air stream, more dried and having a higher temperature than the cold air, is present in a manner surrounding an atmosphere of the cold air around the grinding or cutting spot or tool.

6. A method for processing in a cold air blast according to claim 5, wherein a temperature of the cold air is set at minus 30° C. or lower and a wind pressure thereof is set at 1 Mpa or less.

7. An apparatus for effecting grinding with a grinding stone or cutting with a cutting bite in a cold air blast, while a grinding or cutting tool contacts a grinding or cutting spot, comprising: cooling means for decreasing a temperature of a filtered, compressed dry air to minus 1° C. or lower; a cold air blasting unit which supplies a cold dry air cooled by the cooling means to the grinding or cutting spot; and means for supplying an extremely small volume of an atomized vegetable oil to the grinding or cutting spot by way of the grinding or cutting tool; wherein the volume of the atomized vegetable oil supplied by the supplying means is set at 70 ml/h·mm or less of length of a workpiece.

8. An apparatus according to claim 7, wherein the apparatus further has an air pipe line for circulation of the cold air, which has passed the grinding or cutting spot and has been collected, and a filter for removal of processing chips in the pipe line.

9. An apparatus according to claim 7, wherein an atmosphere at regions around a nozzle for blasting the cold dry air and for supplying the atomized vegetable oil, and the grinding or cutting spot, is spatially separated from an atmosphere outside by a surrounding air curtain, wherein the air curtain is constructed in a double structure consisting of inner and outer curtains, an air stream speed in the inner curtain being set to be faster than that of the outer curtain so that an inside of the air curtain is separated from an outside atmosphere so as to keep the temperature of the region around the grinding or cutting spot as cold as the temperature of the cold dry air.

10. An apparatus according to claim 7, wherein the cold air blasting unit supplies the cold dry air at a temperature and wind pressure set to apply a compression residual stress of between minus 400 MPa and minus 100 MPa to an average depth of at least 10 $\mu$m from a ground surface of the grinding or cutting spot.

11. An apparatus according to claim 7, wherein the extremely small volume of the atomized vegetable oil is supplied to the grinding or cutting spot together with the cold dry air, and wherein the means for supplying the atomized vegetable oil and the cold air blasting unit are placed in positions adjacent to each other.

12. An apparatus according to claim 7, wherein the extremely small volume of the atomized vegetable oil is supplied to the grinding or cutting spot together with the cold dry air, and wherein the atomized vegetable oil is carried from an oil atomizer to the grinding or cutting spot by the cold dry air itself.

13. An apparatus for effecting grinding with a grinding stone or a cutting with a cutting bite in a cold air blast, while a grinding or cutting tool contacts a grinding or cutting spot, comprising: cooling means for decreasing a temperature of a filtered, compressed dry air to minus 1° C. or lower; a cold air blasting unit which supplies a cold dry air cooled by the cooling means, to the grinding or cutting spot; and means for supplying an atomized vegetable oil to the grinding or cutting spot by way of the grinding or cutting tool, including a cold air blasting unit equipped with a suction port of a venturi tube and a high frequency vibratory oil atomizer connected with the suction port of the venturi tube.

14. A method for processing in a cold air blast, wherein a grinding or cutting tool contacts a grinding or cutting spot to effect grinding or cutting, comprising the steps of: supplying cold dry air of minus 1° C. or lower to the grinding or cutting spot, and. at the same time, grinding or cutting with the grinding or cutting tool which has been treated by a fixed lubrication treatment, wherein another air stream more dried and having a higher temperature than the cold air is present in a manner surrounding an atmosphere of the cold air around the processing spot or tool.

15. An apparatus for effecting grinding with a grinding stone or a cutting with a cutting bite in a cold air blast, while a grinding or cutting tool contacts a grinding or cutting spot, comprising: cooling means for decreasing a temperature of a filtered, compressed dry air to minus 1° C. or lower; a cold air blasting unit which supplies a cold dry air cooled by the cooling means, to the grinding or cutting spot; and means for supplying an atomized vegetable oil to the grinding or cutting spot by way of the grinding or cutting tool, wherein the apparatus further has an air pipe line for circulation of the cold air, which has passed the grinding or cutting spot and has been collected, and a filter for removal of processing chips in the pipe line, and wherein the cold air blasting unit has a double structure comprising central and outer nozzles, said central nozzle being used to blast the cold air and said outer nozzle being used to supply an accompanying dry air dehumidified to a dew point equal to or lower than a temperature of the cold air at an opening of the central nozzle.

16. An apparatus according to claim 15, wherein the accompanying dry air is dry air which has its temperature range in the vicinity of room temperature, is dehumidified down to a dew point equal to or lower than the temperature of the cold air at the opening of the central nozzle and flows at a lower rate under a lower wind pressure than those of the cold air.

17. An apparatus according to claim 15, wherein the accompanying dry air is produced by branching part of air in the middle of a dry air path at an upstream position of the cooling means and then making the branched air to flow through a dehumidifier to become dry air.

18. An apparatus according to claim 15, wherein a partition wall between the nozzles for blasting the cold air and the accompanying dry air is made from a member of a lower heat conductivity.

19. An apparatus according to claim 15, wherein the means for supplying the atomized vegetable oil and the nozzle for blasting the cold air are placed in adjacent positions to each other and the nozzle for supplying the accompanying dry air is arranged at least in such a manner to surround the nozzle for blasting the cold air.

* * * * *